United States Patent [19]

Stegenga et al.

[11] 4,315,614

[45] Feb. 16, 1982

[54] CONSTANT TORQUE PIVOT ASSEMBLY

[75] Inventors: Philip D. Stegenga; Wayne Vanden Brink, both of West Olive, Mich.

[73] Assignee: Donnelly Mirrors, Inc., Holland, Mich.

[21] Appl. No.: 797,023

[22] Filed: May 16, 1977

[51] Int. Cl.³ .............................................. B60R 1/02
[52] U.S. Cl. .................................... 248/479; 403/146; 403/162
[58] Field of Search ................ 403/146, 162; 248/293, 248/475 B, 479

[56] References Cited

U.S. PATENT DOCUMENTS

| | | | |
|---|---|---|---|
| 1,637,842 | 8/1927 | West | 248/293 |
| 1,807,256 | 5/1931 | Ryder | 248/293 |
| 2,676,821 | 4/1954 | Reichelderfer | 403/146 X |
| 2,964,341 | 12/1960 | Doyle et al. | 403/162 |
| 3,214,125 | 10/1965 | Pyuro | 403/162 X |
| 3,328,072 | 6/1967 | Adamski | 403/162 X |
| 3,362,671 | 1/1968 | Johnson | 403/146 X |
| 3,622,112 | 11/1971 | Stroh | 248/181 |

Primary Examiner—William H. Schultz
Attorney, Agent, or Firm—Price, Heneveld, Huizenga & Cooper

[57] ABSTRACT

The specification discloses a constant torque pivot assembly for connecting a pivot arm supporting a mirror or the like to a support bracket coupled to the side of a vehicle. A pivot axle extends through apertures in the pivot arm and the support bracket and has heads at the extremities to compress therebetween noncorrosive washers and a spring so that relative rotational movement between the pivot arm and the support bracket is resisted by a constant torque.

3 Claims, 3 Drawing Figures

4,315,614

CONSTANT TORQUE PIVOT ASSEMBLY

BACKGROUND OF THE INVENTION (1) Field of the Invention

This invention relates generally to mounting arrangements for a bracket supporting a mirror or the like; and, more particularly, to a mounting which is biased to resist rotational movement.

(2) Prior Art

Vehicles having a variable effective length, such as, for example, vehicles towing trailers or trucks with camper bodies mounted on the back require a rear view mirror assembly that gives the vehicle operator an adequate field of vision outwardly and to the rear of the cargo. However, it can be appreciated that to provide a view of what is directly behind the vehicle requires positioning a rear view mirror at the side of the vehicle in at least two different positions. That is, when the vehicle is towing cargo the mirror is typically positioned further outward from the vehicle than when the vehicle is not towing cargo. Clearly, it would be desirable to avoid the cost and installation of two complete sets of rear view mirrors. The prior art teaches adjustability of a single rear view mirror between an inward and an outward position using fasteners which are loosened to move the mirror and tightened to secure the mirror.

In addition to adjustability, a rear view mirror must also provide sufficient stability so vibration does not blur the view to the rear, so wind does not deflect the rear view mirror from the desired position, and so it will deflect out of the way when struck accidentally or intentionally to reduce the effective width of the vehicle. Pivotal brackets have often failed to fulfill these requirements because of the failure of fasteners either to properly adjust the tension on the pivot or to properly support the mirror. Indeed, the use of threaded fasteners makes the mirror susceptible to intentional or accidental misadjustment or removal. Further, rear view mirrors mounted on the outside of a vehicle have been susceptible to the corrosive forces of water and salt thus impairing the proper functioning and adjustment of the mirror. These are some of the drawbacks this invention overcomes.

SUMMARY OF THE INVENTION

A constant torque joint structure for two members which connects, for example, a pivot arm supporting a mirror or the like to a support bracket coupled to a vehicle and includes a pivot axle which extends through apertures in the pivot arm and the support bracket. Frictional connecting means, such as washers, are mounted on the pivot axle for resisting relative rotational movement between the pivot arm and the support bracket. Further, there are means for applying a constant, nonadjustable biasing force between the frictional connecting means and the pivot arm thereby providing a constant torque resisting relative rotation between the pivot arm and the support bracket.

Employing means for applying a constant, nonadjustable biasing force produces an advantageous pivot assembly wherein a constant torque is required for rotational movement of the pivot arm. The biasing force and the frictional connecting means can be chosen so this torque is set high enough to resist deflection by wind and by vibration due to vehicle movement. The biasing means also tends to compensate for wear between the frictional connecting means, the pivot arm and the support bracket and thus maintains the constant torque requirement. Further, neither accidental nor intentional attempts to adjust the biasing force, after assembly of the joint structure, will change the torque required to rotate the pivot arm. The joint structure provides a relatively simple, foolproof pivotal support for a mirror or the like.

In accordance with one embodiment of this invention, the frictional connecting means is a noncorrosive washer thus further insuring the requirement for a constant predetermined torque to pivot the mirror even in the presence of a corrosive environment typical of that encountered by motor vehicles. Also, in accordance with one embodiment of this invention, the pivot axle, about which the mirrorsupporting pivot arm rotates, has rivet-like heads which, together with biasing means, apply an axial compressive force to the assembly of the frictional connecting means, the pivot arm and the support bracket. Once the heads are formed, the assembly is essentially permanent and a constant force is applied to the assembly held between the axle heads.

DETAILED DESCRIPTION OF THE INVENTION

Figure 1:
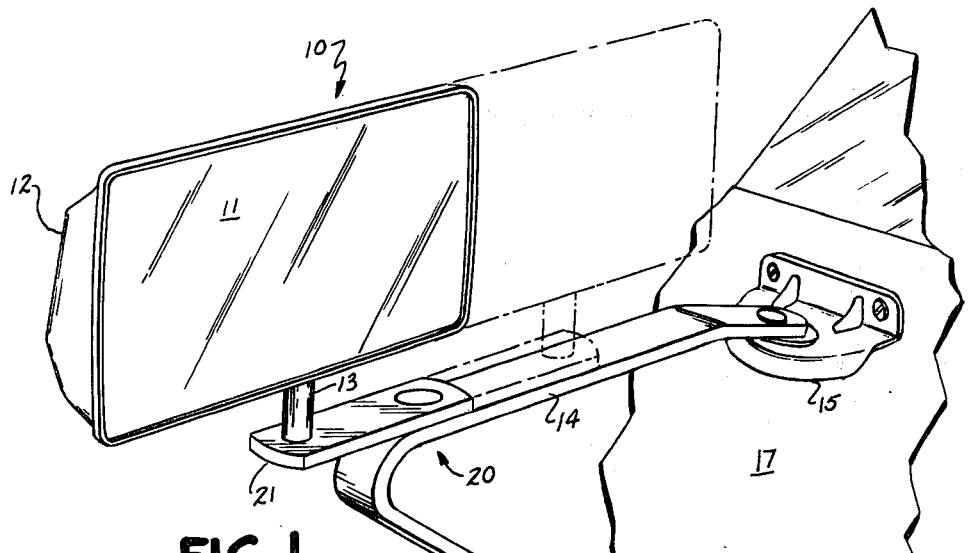
FIG. 1 is a perspective, fragmentary view of a pivot assembly and mirror mounted on a vehicle, in accordance with an embodiment of this invention.

Referring to FIG. 1, a mirror assembly 10 is mounted on the side of a vehicle 17 and includes a generally C-shaped support bracket 14 having its two ends coupled to vehicle 17. An upper mounting bracket 15 couples the upper leg of support bracket 14 to vehicle 17 and a lower mounting bracket 16 couples the lower leg of support bracket 14 to vehicle 17. Advantageously, mounting brackets 15 and 16 can both pivot and resist such pivoting unless a predetermined force is applied to mirror assembly 10 causing it to swing relatively freely alongside vehicle 17 thus narrowing the effective width of vehicle 17. Bracket 15 forms no part of the present invention but is disclosed and claimed in copending United States Patent Application Serial No. 797,605 and Serial No. 797,022, now United States Patent Nos. D250,702 and 4,135,694, respectively, invented by Philip Stegenga and Wayne VandenBrink, entitled PIVOT SUPPORT BRACKET, filed on even date herewith and assigned to the assignee of the present application. A mirror 11 is coupled to support bracket 14 by a pivot assembly 20 for positioning the mirror close to or further away from the vehicle. An elongated pivot arm 21 is rotationally connected to support bracket 14 at one end and at the other end is coupled to a mirror stem 13 which supports a mirror head 12 in which is mounted mirror 11. As is known in the art, mirror head 12 can rotate about mirror stem 13 by such means as a ball joint connection.

Figures 2, 3:
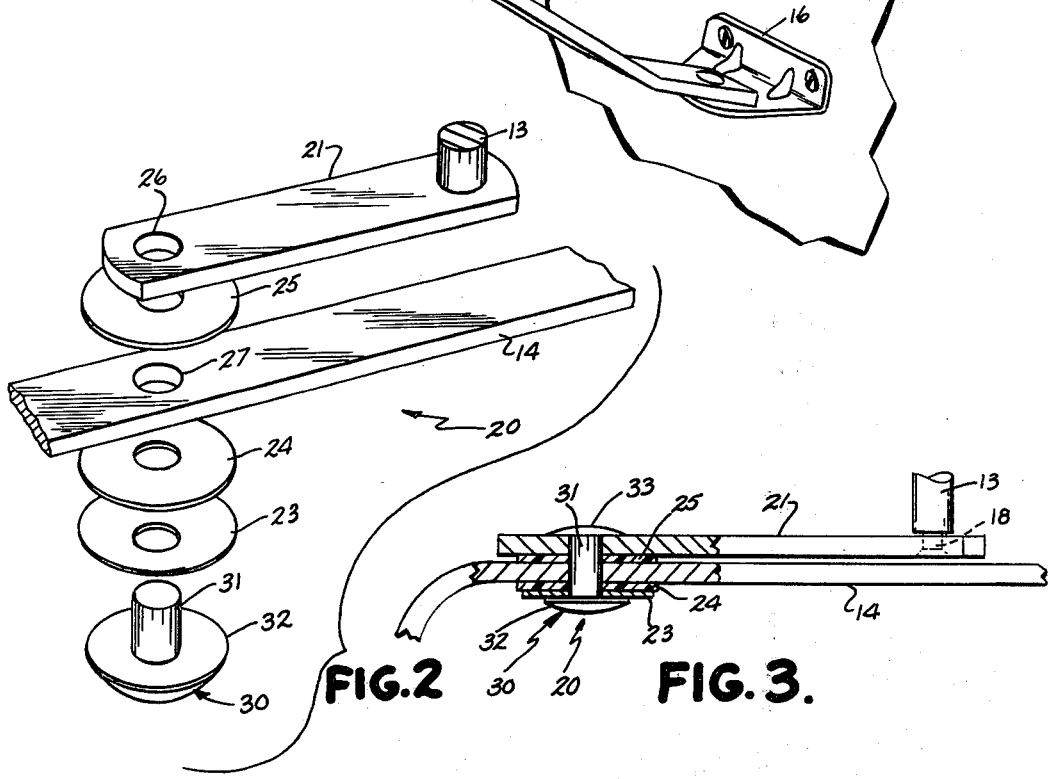
FIG. 2 is an exploded, fragmentary perspective view of a partly assembled pivot assembly in accordance with an embodiment of this invention.
FIG. 3 is a side elevation, shown partly cross section, of a pivot assembly in accordance with an embodiment of this invention.

Referring to FIGS. 2 and 3, a screw 18 passes through an opening in pivot arm 21 and is coupled to the bottom portion of mirror stem 13 thus securing stem 13 to pivot arm 21. Support bracket 14 and pivot arm 21 have a bracket aperture 27 and pivot aperture 26, respectively, for passing a pivot axle 30. Pivot axle 30 includes a head 32 and an elongated, integral shank 31. Mounted on shank 31 above head 32 are, in order, a spring washer 23, a friction washer 24, support bracket 14 at aperture 27, a friction washer 25, and pivot arm 21 at aperture 26. As shown in FIG. 3, the upper portion of shank 31 is deformed to form a head 33 thus securing pivot assembly 20 between heads 32 and 33. Head 33 is formed sufficiently close to head 32 so a compressive force is applied between heads 32 and 33, which are longitudinally and rotationally fixed.

Spring washer 23 is a generally frusto-conical washer having a central aperture, made of a material such as spring steel and typically known as a "Belleville" washer. Washers 24 and 25 are made of a noncorrosive resilient material such as nylon and frictionally engage the abutting members of pivot assembly 20. More particularly, as already noted, heads 32 and 33 are formed sufficiently close together to compress and deflect spring washer 23 thus providing a biasing force between the heads. Thus, a constant, substantially nonadjustable force is applied axially to pivot assembly 20 and resists a torque applied to cause relative rotation between pivot arm 21 and support bracket 14. Such a constant torque force is particularly advantageous in resisting the effects of wind and of vibration. In other words, pivot assembly 20 provides a constant torque resisting rotation and permits rotation when an externally applied torque exceeds the torque resisting rotation. The noncorrosive nature of washers 24 and 25 helps insure that the resistance to an applied torque is not changed by corrosion. That is, the rotational contact surfaces between pivot arm 21 and support bracket 14 occur on the noncorrosive material of washers 24 and 25.

As an example of an embodiment of this invention, the thickness of washers 24 and 25 can be about one-sixteenth inch. Pivot axle 30 can have a push-through force of about 1250 pounds. Spring washer 23 can advantageously have a characteristic wherein biasing force increases as deflection of spring washer 23 increases. Thus the force resisting rotation can be controlled, and initially determined, by the compressive force applied by heads 32 and 33 on spring washer 23 and by changing the coefficient of friction of washers 24 and 25. For example, Teflon may be used to provide a relatively low coefficient of friction. Other coefficients of friction can be obtained by use of materials such as polypropylene, nylon and plastics in general. Preferably, washers 24 and 25 are chosen to be of the same material. However, if desired they can be selected to be of different materials and hence can have different coefficients of friction. The controlled force required to move pivot arm 21 can be, for example, 30 to 50 inch-pounds.

In the present embodiment, support bracket 14 and pivot arm 21 are formed of a metal, such as aluminum, with a generally rectangular cross section. Similarly, pivot axle 30 is formed of aluminum or a similar metal. Washers 24 and 25 are chosen to be of the material which has a sliding friction generally responsive to the axial pressure applied. Nylon is particularly advantageous for washers 24 and 25 because it resists wear well and has sufficient lubricity so as not to abrade the adjacent surfaces of pivot arm 21 and support bracket 14. However, should some wear occur from repeated pivoting of pivot assembly 20, spring washer 23 continues to provide a biasing force to take up any slack in pivot assembly 20 and maintain a substantially constant force throughout the life of the assembly. Without such a biasing means, pivot assembly 20 would loosen and have a substantially reduced capacity to resist an applied torque.

Referring to FIG. 1, mirror 11 and pivot arm 21 are shown in phantom in an inward position. Such a position is achieved by rotating pivot arm 21 about pivot axle 30. Additionally, mirror 11 is rotated about mirror stem 13 to properly position mirror 11 for rear viewing. It can be appreciated that pivot arm 21 is infinitely adjustable with respect to support bracket 14 and can assume any intermediate position. Regardless of the position, pivot assembly 20 provides a constant torque resistance to rotation. Mirror assembly 10 can be mounted on a left-hand door or a right-hand door and pivoted into the desired position for rear viewing. Thus, there is the advantage of having a single structure suitable for both sides of a vehicle.

As can be seen from the above description of the drawings, this constant torque pivot assembly 20 is fabricated using relatively simple and few components. Further, the critical part of establishing the biasing force on pivot assembly 20 can be done at a factory, and not in the field, when pivot axle 30 is formed with heads 32 and 33 in place. Thus, not only are no tools required in the field to assemble or to pivot mirror assembly 10, intentional or unintentional misadjustment of pivot assembly 20 cannot occur.

Various modifications and variations will no doubt occur to those skilled in the art to which this invention pertains. For example, the number or thickness of washers or the particular shape of the pivot arm may be varied from that disclosed herein. These and all other variations which basically rely on the teachings through which this disclosure has advanced the art are properly considered within the spirit and broader aspects of this invention.

The embodiments of the invention in which an exclusive property or privilege is claimed are defined as follows:

1. A pre-assembled constant torque pivot assembly for connecting an apertured pivot arm supporting a mirror or the like to an apertured support bracket, said support bracket being adapted for coupling without modification, to either the left-hand or the right-hand side of a vehicle comprising:
   a pivot axle extending through said pivot arm and support bracket apertures and retaining said pivot arm and support bracket in lap joint relationship to one another;
   a first frictional washer fabricated of a noncorrosive material and mounted on said pivot axle between said pivot arm and said support bracket;
   a second frictional washer mounted on said pivot axle on the other side of one of said pivot arm or support bracket, said second frictional washer being fabricated of a noncorrosive material;
   a spring washer mounted on said pivot axle on the outside of said second washer from said pivot arm and support bracket and bearing directly against said second washer; and
   said pivot axle having two longitudinally and rotationally fixed, nonadjustable heads; one head being at each end of a shank between said heads; said pivot arm, said support bracket, said first washer, said second washer and said spring washer being mounted on said shank; said heads being spaced sufficiently close together to retain said spring washer in compression to provide a compressive force between said two heads which is applied to said first and second washers whereby relative rotation between said pivot arm and said support bracket is resisted by a constant torque.

2. A pre-assembled constant torque pivot assembly as recited in claim 1 wherein:

said first and second washers are fabricated of nylon; and said pivot axle, said pivot arm and said support bracket are fabricated of metal.

3. The assembly of claim 1 wherein said first apertured washer is made of a material having a different coefficient of friction from the coefficient of friction of the material of said second apertured washer.

* * * * *